US012729577B2

(12) United States Patent
Nee et al.

(10) Patent No.: US 12,729,577 B2
(45) Date of Patent: Sep. 8, 2026

(54) DEVICE FOR CLOSING OFF AN OPENING MADE IN THE BODY OF A VEHICLE, AND CORRESPONDING VEHICLE

(71) Applicant: ADVANCED COMFORT SYSTEMS FRANCE SAS-ACS FRANCE, Bressuire (BR)

(72) Inventors: Maxime Nee, Bressuire (FR); Thierry Turc, Bressuire (FR); Anthony Jean, Haute-Goulaine (FR)

(73) Assignee: ADVANCED COMFORT SYSTEMS FRANCE SAS-ACS FRANCE, Bressuire (FR)

( * ) Notice: Subject to any disclaimer, the term of this patent is extended or adjusted under 35 U.S.C. 154(b) by 47 days.

(21) Appl. No.: 18/835,026

(22) PCT Filed: Feb. 3, 2022

(86) PCT No.: PCT/EP2022/052643
§ 371 (c)(1),
(2) Date: Aug. 1, 2024

(87) PCT Pub. No.: WO2023/147865
PCT Pub. Date: Aug. 10, 2023

(65) Prior Publication Data

US 2025/0163741 A1 May 22, 2025

(51) Int. Cl.
*E05D 15/10* (2006.01)
*B60J 1/16* (2006.01)

(52) U.S. Cl.
CPC ............ *E05D 15/1047* (2013.01); *B60J 1/16* (2013.01); *E05D 2015/1055* (2013.01);
(Continued)

(58) Field of Classification Search
CPC .... E05D 15/1047; E05D 15/1042; B60J 1/16; B60J 1/1853
See application file for complete search history.

(56) References Cited

U.S. PATENT DOCUMENTS 5,799,449 A 9/1998 Lyons et al.
8,562,063 B2 * 10/2013 Giret .................. E05D 15/1047 296/146.15
(Continued)

FOREIGN PATENT DOCUMENTS

EP 0778168 B1 6/2001
EP 0857844 B1 12/2002
(Continued)

*Primary Examiner* — Marcus Menezes
(74) *Attorney, Agent, or Firm* — S.J. INTELLECTUAL PROPERTY LTD.

(57) ABSTRACT

A device (1) for closing off an opening, comprising a stationary portion (11) in which an opening is defined, and at least one movable panel (12) sliding along two rails (114, 115) mounted on one face of the stationary panel (11), between a closure position, closing off the opening, in a closure plane defined by the stationary panel (11) and at least one opening position, in a sliding plane, substantially parallel to the closure plane, each of the rails (114, 115) carrying at least one shuttle (2) movable in translation in the rail (114, 115) and ensuring passage of the movable panel (12) from the closure position into the sliding position, and vice-versa, using at least one groove (22, 23) guiding a pin (124, 125) secured to the movable panel (12), and slidable movement of the movable panel (12) in the closure plane to place the movable panel in an open position.

18 Claims, 7 Drawing Sheets

(52) U.S. Cl.
CPC ..... *E05Y 2201/224* (2013.01); *E05Y 2201/48* (2013.01); *E05Y 2201/64* (2013.01); *E05Y 2900/55* (2013.01)

(56) References Cited

U.S. PATENT DOCUMENTS

| | | | | |
|---|---|---|---|---|
| 11,261,633 | B2 * | 3/2022 | Kuroda | E05F 15/646 |
| 2005/0044799 | A1 | 3/2005 | Kinross et al. | |
| 2021/0245593 | A1 * | 8/2021 | Kim | E05C 9/04 |

FOREIGN PATENT DOCUMENTS

| | | | |
|---|---|---|---|
| EP | 3832060 | A1 | 6/2021 |
| EP | 3967531 | A1 | 3/2022 |
| FR | 2910519 | A1 | 6/2008 |
| GB | 696860 | A | 9/1953 |
| WO | 2010/032273 | A1 | 3/2010 |

* cited by examiner

DEVICE FOR CLOSING OFF AN OPENING MADE IN THE BODY OF A VEHICLE, AND CORRESPONDING VEHICLE

1. FIELD OF THE INVENTION

The field of the invention is that of aperture equipment, used in particular in motor vehicles.

More specifically, the invention relates to devices for closing off an aperture formed in a structural element, for example in the body of a vehicle, or in a door of the vehicle, and comprising a sliding movable portion capable of clearing or closing an opening while offering a flush appearance, when viewed from the outside.

The invention can also equip different other types of structures, such as caravans, campervans, coaches and buses, minibuses, trucks, vans, boats, etc.

Such devices, developed for several years by the Applicant of the present application, are known in particular as "flush aperture".

In other words, these devices are designed so as to have, when viewed from the outside, a flush or almost-flush appearance between the body, or more generally the wall or the structure, and the stationary panel of the device.

2. PRIOR ART

The general principle of this technique is described in particular in the patent documents EP-0 778 168 and EP-0 857 844.

The closure device (hereinafter so-called "flush aperture") comprises a stationary portion and a portion movable relative to this stationary portion, or sliding panel.

The movable portion is connected to the stationary assembly by functional elements which ensure the required mobility and which are attached onto the face of the stationary portion directed towards the inside of the vehicle.

These functional elements, or rails, ensure a function of guiding and holding the movable panel. They are placed on the face directed towards the inside of the vehicle, away enough from the edges, or from the periphery, of the stationary portion so that this periphery could be secured directly to the edges of the aperture, without the rails interfering. Thus, it is possible to dispense with the presence of a connecting frame between the edges of the aperture and the stationary portion.

This stationary portion may be made of one or more element(s) (placed next to one another in the same plane), for example made of glass or polycarbonate.

Thus, such a flush aperture can be entirely mounted independently of the vehicle, and attached, from the outside, in the compartment defined to this end by the aperture, or the compartment defined in the body, or more generally in the wall.

The edges of the stationary portion are secured, for example by means of an adhesive bead, to the edges of the aperture, without any other intermediate connecting element.

In aesthetic terms, the flush aperture has a smooth, flush appearance, when viewed from the outside, because no frame is necessary on the contour of the opening formed in the stationary assembly.

To ensure movement of the movable portion, generally consisting of a transparent panel, a guide device is therefore provided including first and second guide rails mounted on the stationary portion (or stationary structure) the aperture, on both sides of the opening closed by the movable panel.

According to a known technique, the movable panel is mounted on the rails, via shutters, to slide for example according to a longitudinal direction, in a sliding plane between one (or more) opening position(s) and a closure position, in which it closes off the opening.

To maximise the flush appearance, it has been proposed that, in the closed position, the movable panel is inscribed within the plane of the stationary portion, by passing from an intermediate disengagement position, in the sliding plane, opposite the opening and disengaged from the latter into the closure position.

To do so, each of the shuttles has tracks capable of cooperating with pins carried by the movable panel. During the movement of the shuttles, these tracks allow driving the movable panel, relative to the stationary portion, according to a movement that could be decomposed into two independent movements, namely:

- a perpendicular movement towards the inside of the vehicle in two times (so-called sway) relative to the plane formed by the stationary portion, enabling passage from a closed and locked position, in which the movable panel is in the same plane as the stationary portion and the opening, into an intermediate release position, in which the movable panel is offset with respect to the stationary portion opposite the opening and disengaged from the latter, in a sliding plane, so as to enable this sliding. Thus, the movable panel is movable according to a release direction perpendicular to the sliding direction, and
- a movement in the sliding plane, parallel to the plane formed by the stationary portion.

It should be noted that the term "plane" should herein be understood in a broad acceptance: the plane formed by the aperture is sometimes curved, according to one, or two, direction(s) to adapt to the shape of the structure (this also justifies the term "substantially" used in the description and the claims).

The movable panel can be moved manually or using an electric motor. In the latter case, actuation means act on one of the shuttles present in the rails in order to move the movable panel between a closed position and at least one open position. In particular, the actuation means may be in the form of a cable (so-called Push-Pull cable) connected to the electric motor so as to pull or push the movable panel. The actuation means may also be in the form of a rack or bicycle cable type cables.

However, the Applicant has observed that such a closure device could have drawbacks due to inadvertent movements of the movable panel relative to the shuttle, in the open position. In particular, this may happen when a force, having a component directed perpendicularly to the sliding plane, is applied on the movable panel. In such a situation, some components enabling movement of the movable panel may undergo inadvertent stresses, which may be particularly detrimental to the operation and/or to the integrity of the closure device.

Hence, there is a need to provide a new sliding technique for a movable panel of an aperture for closing off a structure, such as a motor vehicle or the like, enabling a movement that is simple, effective and reliable, avoiding such inadvertent movements of the movable panel relative to the shuttles.

There is also a need to provide such a technique which does not disturb the opening and closure operations, i.e. the passage from the sliding position into the closure position of the movable panel, and vice versa.

There is also a need to provide such a manufacturing, assembly and/or maintenance technique that is simple and low-cost.

3. SUMMARY OF THE INVENTION

The technique of the invention allows solving at least some of the drawbacks raised by the prior art. More specifically, the proposed technique relates to a device for closing off an aperture formed in a structure, comprising a stationary portion, in which an opening is defined, and at least one sliding movable panel guided along two guide rails mounted on a face of said stationary panel, between a closure position, closing off said opening, in a first plane defined by said stationary panel, so-called the closure plane, and at least one opening position, in a second plane, so-called the sliding plane, substantially parallel to said closure plane, each of said guide rails carrying at least one shuttle translationally guided in said rail, translationally movable in said guide rails, and ensure passage of the movable panel from said closure position into said at least one sliding position, and vice versa, using at least one groove guiding a pin secured to said movable panel, and the sliding movement of said movable panel in said closure plane to place said movable panel in an open position.

According to the proposed technique, said shuttle comprises means for blocking at least one of said pins in the corresponding groove, in a blocking position, when said movable panel is in said open position, so as to oppose an inadvertent movement of said movable panel relative to said shuttle according to a direction perpendicular to said sliding plane.

In this manner, when a passenger of the vehicle exerts a force, having a component directed perpendicularly to the sliding plane, on the movable panel, the blocking means oppose the inadvertent movement of the pin, and therefore of the movable panel, according to this perpendicular axis. Thus, any inadvertent forces on the movable panel, according to this axis, are avoided, which may be particularly detrimental to the operation and/or to the integrity of the closure device.

According to a particular embodiment, the bottom of said groove carries a stop for blocking said pin, holding said pin at the end of said groove corresponding to said opening position.

According to another particular embodiment, said stop is mounted on a flexible blade.

According to another particular embodiment, the closure device comprises means opposing a deformation of said blade when said movable panel is in an open position, and means enabling a deformation of said blade when said panel is in a transition area between said closure plane and said sliding plane.

According to another particular embodiment, said means opposing a deformation comprise an excrescence extending under said blade and bearing against the bottom of said rail.

Such an excrescence is a simple and effective solution allowing, at lower costs, opposing any deformation of the blade when the movable panel is in an open position.

According to another particular embodiment, said rail has a release portion, for example a hole or a cup, coinciding with said transition area, so that said blade could move and enable disengagement of said pin from said stop, when said movable panel is in said transition area.

According to one variant, said release portion is made by stamping said bottom of said rail.

Such a configuration allows having a one-piece guide rail simplifying in particular assembly and maintenance of the closure device.

According to another variant, said release portion is an insert fitting into an opening formed in said bottom of said rail.

According to another particular embodiment, said stop has inclined planes.

Such inclined planes enable the pin carried by the movable panel to progressively exert a pressure force on the blocking stop during passage from the closed position into the open position of the movable panel, and vice versa. More specifically, this pressure force causes a progressive deformation of the blade, when the latter is arranged opposite a hole or cup formed in the rail in order to enable overlapping and crossing of the blocking means.

According to another particular embodiment, said blade is formed in the mass of said shuttle.

Such a configuration allows having a one-piece shuttle thereby simplifying assembly and maintenance of the closure device.

According to another particular embodiment, said blade is affixed on said shuttle, for example by screwing, clipping and/or gluing.

In particular, such a configuration allows simplifying maintenance of the shuttle, in particular replacement of a damaged blade with a new blade.

According to another particular embodiment, said blade is a spring leaf.

According to a particular aspect of the present technique, said pin is also guided in a rail endpiece, having a guide portion ensuring blocking of said pin in the direction perpendicular to said sliding plane.

Such a groove allows to progressively guide a pin carried by the movable panel from a slide track, directed according to the longitudinal axis of the vehicle, towards a notch for receiving this same pin in the closed position of the movable panel. Thus, the endpiece allows contributing to guidance of the movable panel, in particular in order to avoid the presence of jerks when the latter reaches the closed position, and blocking of the latter.

According to another particular embodiment, said pin is translationally movable along its axis.

According to a particular aspect, the movement of said pin according to its axis allows getting rid of said stop.

The proposed technique also relates to a motor vehicle comprising at least one closure device as described before.

4. LIST OF THE FIGURES

The proposed technique, as well as the different advantages it has, will be more easily understood, in light of the following description of an illustrative and non-limiting embodiment thereof, and from the appended drawings, wherein.

5. DETAILED DESCRIPTION OF THE INVENTION

5.1. General Principle

The general principle of the proposed technique relates to a "flush aperture" type closure device, comprising at least one shuttle having, besides at least one groove for guiding a pin carried by a movable panel, means for blocking this pin. Such blocking means are configured to block the pin in the groove when the movable panel is in an open position, i.e. arranged in a sliding plane.

Such a blocking of the pin allows opposing an inadvertent movement of the movable panel relative to the shuttle according to a direction perpendicular to the sliding plane, and enables only a sloping movement, according to the orientation of the track.

5.2. Description of an Example of a Closure Device According to an Embodiment of the Proposed Technique Next, an embodiment of the proposed technique, considered as a simple illustrative and non-limiting example, is illustrated, with reference to FIGS. 1 to 7C directly or indirectly referring to a side wall of a motor vehicle.

The proposed technique may be applied in the same way to other structures having a wall in which an aperture is defined like, for example, a caravan or a campervan. In particular, the aperture may be formed in a side wall of the vehicle (for example for commercial vehicles, monospaces, breaks, etc.), in a wall directed towards the rear of the vehicle (for example for "pick-up" trucks), or in a door. It may also consist of a separation aperture of a vehicle.

Figure 1:
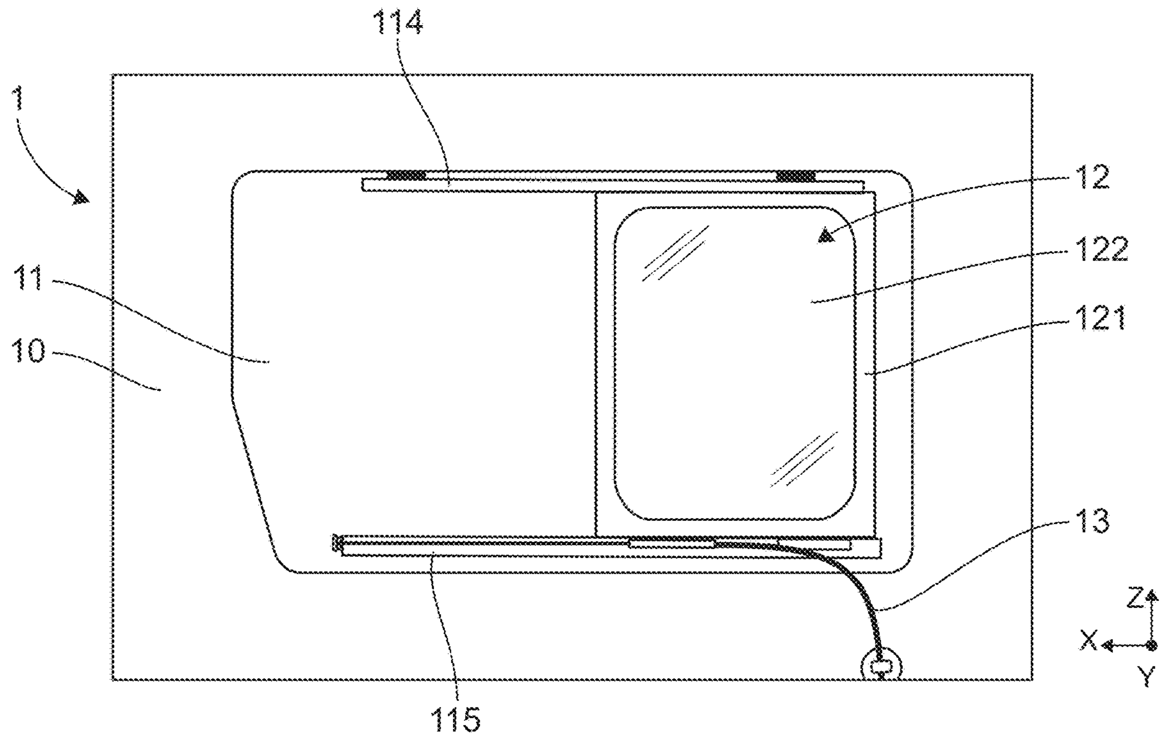
FIG. 1 illustrates an example of a closure device according to the proposed technique in its entirety.
Figure 2:
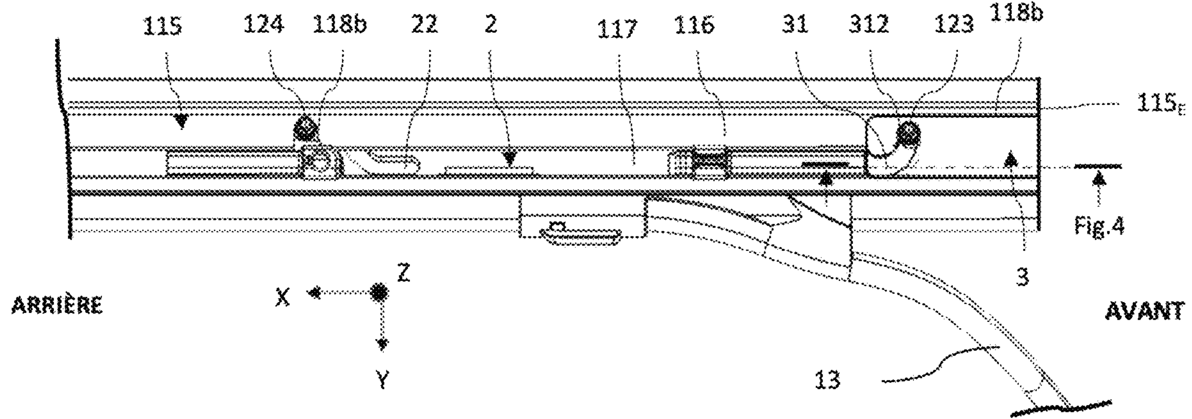
FIG. 2 illustrates a top view of the closure device of FIG. 1 focused on the front portion of the lower guide rail having a lower shuttle in accordance with the proposed technique and pins carried by the movable panel.

First of all, with reference to FIGS. 1 and 2, the general operation of a closure device according to the proposed technique is described. Afterwards, with reference to FIGS. 3 and 4, an example of a shuttle having means for blocking a pin carried by a movable panel as well as an example of a guide rail receiving such a shuttle are detailed. Afterwards, with reference to FIGS. 5A to 7C, the operation of such blocking means is described.

Hereinafter, the same elements bear the same references in the different figures.

5.2.1 General Structure of a Closure Device

FIG. 1 illustrates the entirety of a closure device with a panel slidably movable when viewed from the inside of the vehicle. FIG. 2 illustrates, according to a partial top view, some members contributing to sliding of the movable panel when the latter is in the closed position.

Such a closure device 1 is in the form of an assembly, or "flush aperture", ready to be placed in an aperture (i.e. an opening, or a "hole") formed in the body 10 (side wall for example) or a door, or more generally in the structure of a vehicle (or of a caravan or a campervan, for example), or more generally a wall intended to receive a closure device provided with an opening leaf.

Such a closure device comprises a stationary portion 11, i.e. remaining non-movable relative to the structure 10 that receives it, and a slidably movable panel, or sliding panel, 12, movable relative to the stationary portion 11.

In particular, the stationary portion 11, also so-called stationary panel, may be made of glass or polycarbonate, in one or more element(s).

The stationary portion 11 is pierced with an opening closed off by the movable panel 12 in the position of FIG. 1 and extending in the same plane as the stationary portion 11.

In particular, this movable panel 12 includes a glazed portion 122 and a frame 121.

Guide rails, respectively an upper rail 114 and a lower rail 115, made of a profiled material, are affixed by gluing on the face of the stationary portion 11 directed towards the inside of the vehicle. It should be noted that these rails are remote from the contour of the stationary portion 11, and do not participate, or affect, securing of the latter to the edge of the aperture.

The rails 114 and 115, which are substantially parallel in this example, hold and slidably guide the movable panel 12, which has a frame 121 secured to the rails 114, 115.

The movable panel 12 can be moved along the rails 114, 115, in a sliding plane substantially parallel to the plane defined by the stationary portion 11.

The movable panel 12 can completely close off the opening of the stationary portion 11 (FIG. 1) or partially or totally clear this opening. Thus, the movable panel 12 can take on one or more open position(s), depending on its position with respect to the rails 114, 115.

Moreover, the movable panel 12 can move perpendicularly to the plane defined by the stationary portion 11, so as to close off the opening, in a closed position (FIG. 1), in which it is flush with this stationary portion 11, so as to provide a flush assembly (body 10, stationary portion 11 and movable portion 12).

The movable panel 12 further comprises a seal (not shown), fitted over the frame 121 so as to be secured to the face of the frame 121 directed towards the outside of the vehicle, and having a lip bearing on the face of the stationary portion 11 directed towards the inside of the vehicle, when the latter is in the closure position.

The upper rail 114 carries an upper shuttle (not shown) and the lower rail 115 carries a lower shuttle 2 (FIG. 2).

More specifically, the upper 114 and lower 115 rails are rails comprising a bottom wall and two side walls extending perpendicular to the bottom wall. The other end of the side walls has a short fold 116 allowing receiving and holding the upper and lower shuttles. The structure of the guide rails will be detailed later on.

Each of the lower 2 and upper (not visible) shuttles is substantially in the form of a bar with dimensions adapted for sliding in the guide rails and have front and rear grooves capable of cooperating with front and rear pins 123, 124 fixedly carried by the movable panel 12.

During the movement of the shuttles, these grooves allow driving the movable panel 12, relative to the stationary portion 11, according to a movement which could be decomposed into two independent movements, namely:

a perpendicular first movement (according to the Y axis) towards the inside of the vehicle in two times (so-called sway) relative to the closure plane formed by the stationary portion 11, enabling passage from a closed and locked position, in which the movable panel 12 is in the same plane as the stationary portion 11 and the opening, into an intermediate release position, in which the movable panel 12 is offset with respect to the stationary portion 11 opposite the opening and disengaged from the latter, in a sliding plane, so as to enable this sliding. Thus, the movable panel 12 is in a transition area, according to a perpendicular release direction, between the closure plane and the sliding plane, and a second movement in the sliding plane (according to the X axis), parallel to the plane formed by the stationary portion 11.

Of course, other movements are possible. For example, the movable panel can follow a curve according to which the two movements (locking/unlocking and sliding) are linked.

In particular, the movement of the movable panel 12 is ensured by means of a "push pull" type control cable, or drive cable, 13, coupled to the lower shuttle 2 and driven by motor-driven means controlled by a user.

Finally, in accordance with the proposed technique, and as detailed later on with reference to FIGS. 3 to 7C, the lower shuttle 2 comprises means for blocking the front pin 123 in the front groove, in a blocking position, when the movable panel is in the open position.

5.2.2 Structure of a Shuttle Comprising Means for Blocking a Pin

Figure 3:
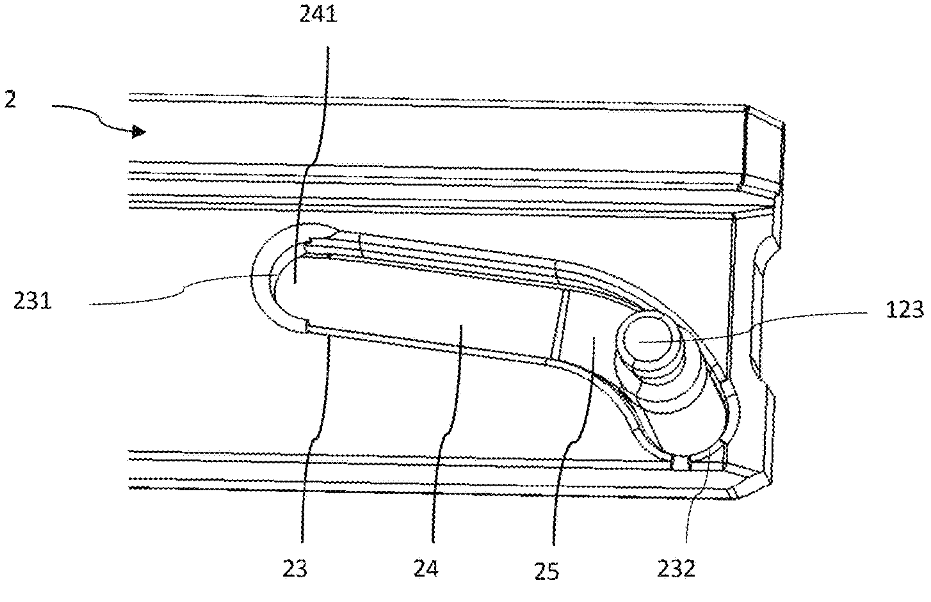
FIG. 3 illustrates a partial view of the front end of the lower shuttle of the closure device of FIG. 2 showing in particular means for blocking the pin carried by the movable panel.
Figure 4:
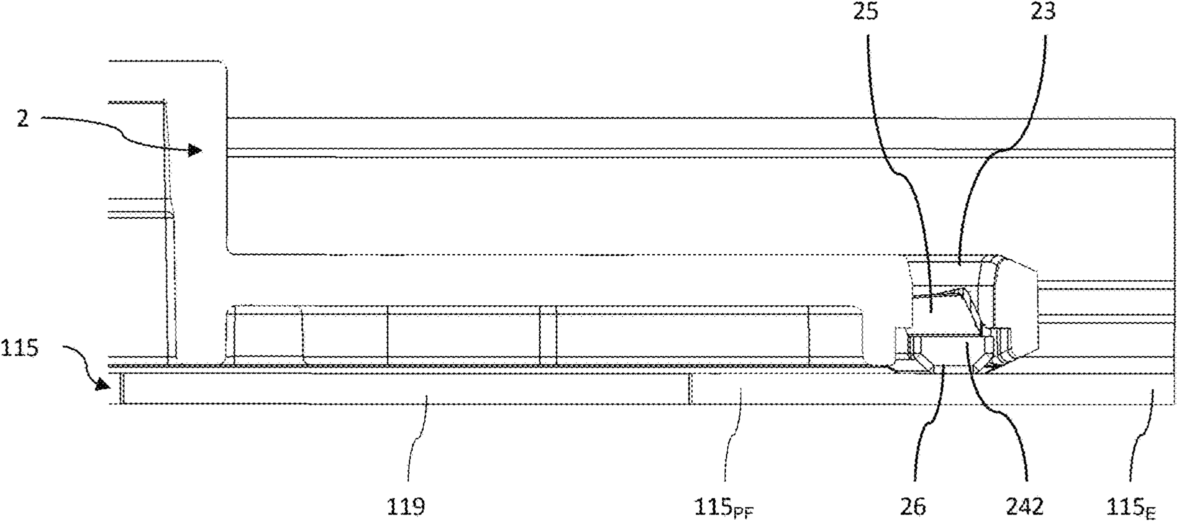
FIG. 4 illustrates a partial sectional view of the front end of FIG. 2, according to the longitudinal axis of the guide rail, showing, according to another angle, the blocking means shown in FIG. 3.

FIGS. 3 and 4 illustrate, according to different partial views, an example of a lower shuttle comprising means for blocking a front pin carried by a movable panel of the closure device.

More specifically, FIG. 3 illustrates a partial view of the front end of the lower shuttle of the closure device of FIG. 2 showing in particular the means for blocking the pin carried by the movable panel. FIG. 4 illustrates a partial sectional view of the front end of FIG. 2, according to the longitudinal axis of the guide rail, showing the considered blocking means according to another angle. To simplify understanding of the invention, the endpiece 3 is not shown in FIG. 4.

As indicated before, each shuttle is substantially in the form of a bar with dimensions suitable for sliding in the associated guide rail and has front and rear grooves capable of cooperating with front and rear pins carried by the movable panel. In the illustrated example of the lower shuttle 2, only the front groove 23, configured to cooperate with the front pin 123 of the movable panel (not shown) is shown.

This front groove 23 is arranged and sized so as to ensure, during the movement of the shuttles in the guide rails, driving of the movable panel according to the previously-described kinematics. Thus, the front pin 123 moves in the front groove 23, when the movable panel is in the transition area, from a first end 231, associated with the closed position of the movable panel, and a second end 232, associated with the opening position(s) of this same movable panel, and vice versa.

In this embodiment, the blocking means are formed by a projection, forming a blocking stop 25, carried by the bottom of the front groove 23. Such a blocking stop 25 is configured to block the front pin 123 of the movable panel in the second end 232 of the front groove 23 when this same movable panel is in the open position.

More specifically, the bottom of the front groove 23 is formed by, or carries, a flexible blade 24, i.e. having elastic deformation properties. The blade 24 has a first end 241, secured to the first end 231 of the front groove 23, and a second end 242, free and located approximately at the second end 232 of this same groove.

Such an arrangement enables the front pin 123 to overlap and then cross, through an elastic deformation of the blade 24, the blocking stop 25 when the pin fits into or disengages from the second end 232 of the front groove 23.

The shuttle 2 further comprises means 26 opposing a deformation of the blade 24 when the movable panel is in an open position. Thus, such means allow locking, or holding, the front pin 123 in the blocking position. Hence, this results in an effective holding of the pin, and therefore of the movable panel, in the blocking position.

As illustrated, the blade 24 is formed in the mass of the shuttle 2. Such a one-piece part may be obtained by making the shuttle in a plastic material, for example. In some variants, it may consist of an affixed blade, relative to a flexible metal blade.

Furthermore, the blocking stop 25 is formed by a projection having first and second inclined planes 251, 252 converging and arranged substantially opposite the first and second ends 231, 232 of the front groove 23 respectively.

Such inclined planes are configured to cooperate with the front pin 123 carried by the movable panel. More specifically, these inclined planes enable the pin to progressively exert a pressure force on the blocking stop. This causes a deformation of the blade, when the latter is arranged opposite a release portion formed in the rail, for example a hole, or cutout, 119 in the described embodiment, and in fine crossing of the blocking stop.

According to a particular embodiment, the hole 119 is made by stamping the bottom wall $\mathbf{115}_{PF}$ of the rail 115. This hole may be surrounded by a drain allowing recovering the water, in the lower rail. In the upper rail, this hole may be covered by the front endpiece to avoid light leakages.

In the illustrated example, the first inclined plane 251 defines, with respect to the blade 24, a first angle $\alpha\mathbf{1}$ having an angle value greater than that of a second angle $\alpha\mathbf{2}$ defined by the second inclined plane 252 with respect to the blade 24. Preferably, the value of the first angle $\alpha\mathbf{1}$ is comprised between 145 and 155° and the value of the second angle $\alpha\mathbf{2}$ is comprised between 115 and 125°.

Thus, one could notice that the front pin 123 of the movable panel should exert a greater pressure force on the blocking stop 25 to disengage from the second end 232 of the front groove 23 than to fit therein. Hence, this results in an improvement in holding of the front pin of the movable panel in its blocking position.

Moreover, the means 26 opposing a deformation of the blade 24, when the movable panel is in an open position, are formed by an excrescence extending under the blade 24. This excrescence 26, arranged substantially under the free end 242 of the blade 24, is configured to bear against the bottom wall $\mathbf{115}_{PF}$ of the lower rail 115.

In this manner, and as will be clearly apparent hereinafter in the description of the kinematics of the blade 24 with reference to FIGS. 5A to 7C, when the excrescence 26 bears against the bottom wall $\mathbf{115}_{PF}$ of the lower rail 115, it opposes any deformation of the blade 24. Thus, the front pin is in the blocking position. However, when the excrescence 26 is cleared from the bottom wall $\mathbf{115}_{PF}$ of the lower rail 115, i.e. opposite the hole 119, the blade 24 can be deformed in order to disengage the pin from its blocking position.

Figures 5A, 5B:
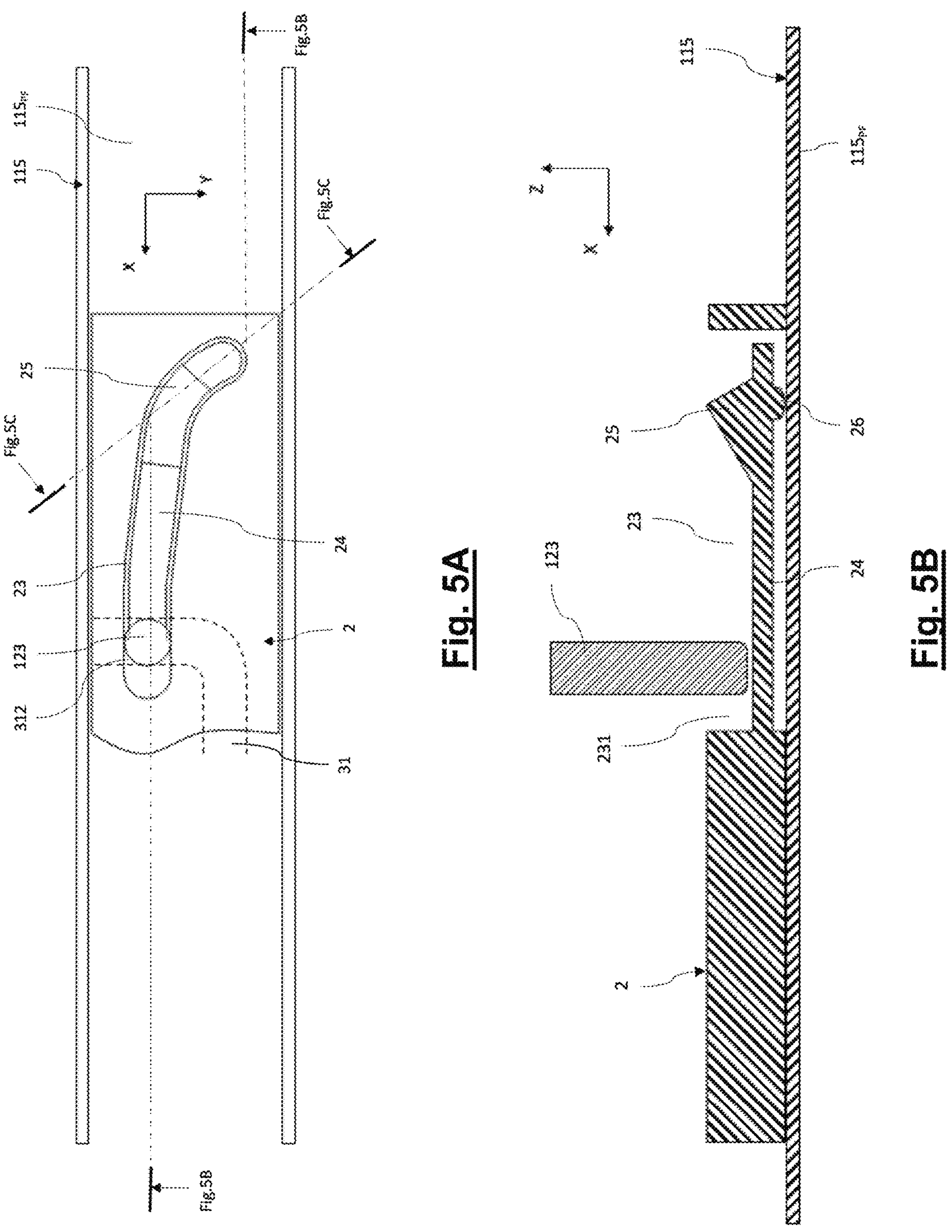
FIGS. 5A, 5B and 5C illustrate different views of the position of a pin of the movable panel with respect to the blocking means of FIGS. 2 and 3 when the movable panel is in the closed position.
Figures 5C, 6:
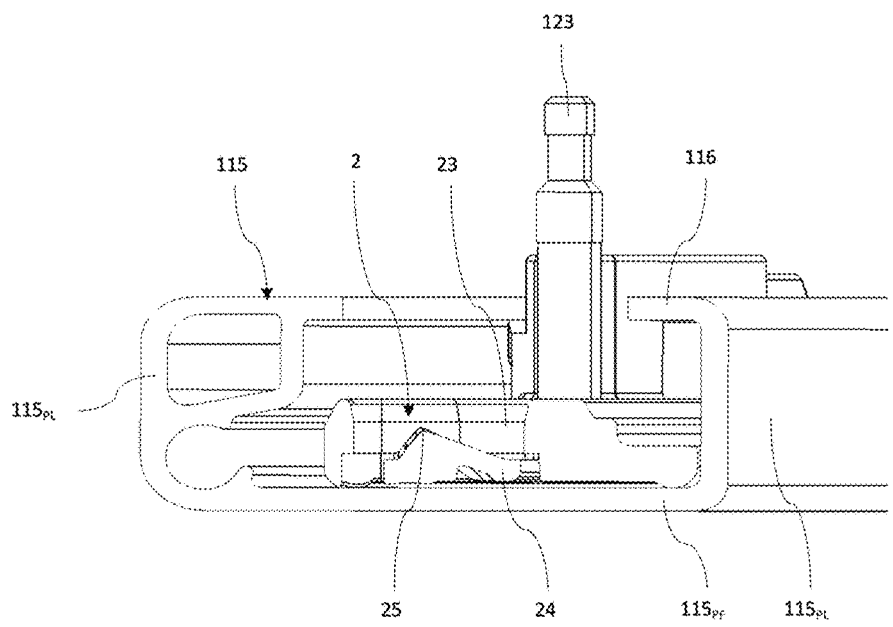
FIG. 6 illustrates a schematic view of a pin of the movable panel crossing the blocking means of FIGS. 2 and 3 when the movable panel is in the intermediate release position.

5.2.3 Structure of a Guide Rail Receiving a Shuttle Comprising Means for Blocking a Pin In particular, FIGS. 2, 4 and 5C illustrate, according to different partial views, an example of a lower guide rail configured to receive a lower shuttle comprising blocking means as described hereinabove.

The lower rail 115 is a profile comprising the bottom wall $\mathbf{115}_{PF}$ and the two side walls $\mathbf{115}_{PL}$ extending perpendicularly to the bottom wall $\mathbf{115}_{PF}$. The side wall $\mathbf{115}_{PL}$ located on the external side of the vehicle comprises the fold 116 which extends perpendicularly to the latter and towards the inside of the vehicle.

Moreover, the bottom wall $\mathbf{115}_{PF}$ of the lower rail 115 has, in the vicinity of its front end $\mathbf{115}_{E}$, a hole 119, i.e. a recess directed according to the Z axis.

As will become more clearly apparent hereinafter, such a hole 119 forms a means enabling, when the movable panel is in the transition area, a deformation of the blade 24 carrying the blocking stop 25 so as to release/disengage the pin from this blocking stop 25.

As illustrated, the lower rail 115 is a profile, made of a metal material, whose fold 116, forming the upper wall of the lower rail 115, defines a track 117 for the movement of the pins 123, 124 of the movable panel 12, according to the X axis, during sliding of the latter from a closed position towards the opening position(s), and vice versa.

The fold 116 also has a front recess 118*a* extending, according to the X axis, from the front end 215E of the rail over a predetermined length and opens onto the track 117. In other words, the front recess 118*a* allows widening the front end of the track 117. This front recess 118*a* is configured to receive an endpiece 3 in which a guide portion, or groove, 31 is formed having one end defining a front notch 312. The fold 116 also has a rear notch 118*b*.

The front 312 and rear 118 slots are configured to receive front and rear pins 123, 124 respectively carried by the movable panel when the latter is in the closed position. Hence, the shapes and dimensions of the front and rear notches 117*a*, 117*b* are complementary to those of the pins of the movable panel.

In other words, the front pin 123 is guided in an endpiece 3 of the lower rail 115, having a guide portion 31 ensuring blocking of the front pin 123 in the direction perpendicular to the sliding plane of the movable panel.

Such a portion or groove 31 allows progressively guiding a pin carried by the movable panel from a sliding track, directed substantially according to the longitudinal axis of the vehicle, towards a notch for receiving this same pin in the final position of the movable panel (closed for example). Thus, the endpiece forming a mechanical stop also allows contributing to guidance of the movable panel in particular in order to avoid the presence of jerks when the latter reaches the closed position.

5.2.4 Kinematics of a Shuttle Comprising Means for Blocking a Pin

FIGS. 5A to 7C illustrate, according to different views, the main steps of the kinematics of the blocking means carried by the lower shuttle and configured, when the movable panel is in the open position, to block the front pin of the movable panel in the front groove of the shuttle.

FIGS. 5A, 5B and 5C illustrate different partial views of the closure device when the movable panel is in the closed position, i.e. located in the closure plane.

When the movable panel (not shown) is in the closed position, the front pin 123 of the movable panel is located in the front notch 312 of the guide groove 31 (shown in broken lines in FIG. 5A) formed in the endpiece secured to the lower rail 115. Thus, the front pin 123 is blocked according to the X axis.

Such an immobilisation of the movable panel according to the X axis may be achieved by blocking one or more of the four pins carried by the movable panel. For example, the implementation of an endpiece as described before allows ensuring an effective immobilisation of the movable panel according to the X axis only by blocking one single pin carried by the movable panel, namely the front pin 123 in the illustrated example.

Moreover, still when the movable panel is in the closed position, the front pin 123 is located at the first end 231 of the front groove 23 of the lower shuttle 2. Thus, the front pin 123 is blocked according to the Y axis.

Thus, the front pin 123 is simultaneously locked according to the axes X and Y when the movable panel is in the closed position. This allows ensuring effective holding of the movable panel in the closed position.

One could notice that the blocking stop 25, which is located between the two ends 231, 232 of the front groove 23, is not stressed when the movable panel is in the closed position. This is normal because the blocking stop 25 is intended to block the front pin 123 when the movable panel is in the open position.

Moreover, the excrescence 26 rests on the bottom wall $\mathbf{115}_{FP}$ of the lower rail 115 so as to oppose any inadvertent deformation of the blade 24. However, it may, alternatively, be considered to do without such a contact between the excrescence 26 and the bottom wall $\mathbf{115}_{FP}$ when the panel is in the closed position.

FIG. 6 illustrates a schematic sectional view of the closure device during the first movement of the movable panel, i.e. when the movable panel is in the transition area between the closure plane and the sliding plane.

During this first movement, the lower shuttle 2 slides inside the lower rail 115 towards the rear of the vehicle according to the X axis.

In particular, this sliding forces the front groove 23 of the lower shuttle 2 to move the front pin 123 in a disengagement direction perpendicular to the closure plane (according to the Y axis). Hence, the front pin 123 disengages from the first end 231 of the front groove 23 of the lower shuttle 2, associated with the closed position of the movable panel, to progressively join the second end 232 of this same groove, associated with the open position of the movable panel. However, such a movement according to the Y axis is possible only if the front pin 123 is held in the front notch 312 of the guide groove 31 of the endpiece secured to the lower rail 115, i.e. blocked according to the X axis.

However, for the front pin 123 to reach the second end 232 of the front groove 23 of the lower shuttle 2, the blocking stop 25, which is in the blocking position, should be temporarily disengaged.

To do so, sliding of the lower shuttle 2 in this transition area allows:

- positioning the blade 24 carrying the blocking stop 25 opposite the hole 119 of the lower rail 115, and
- bringing the front pin 123, which is stationary according to the Z axis, to progressively exert a pressure force on the first inclined plane 251 of the blocking stop 25.

Thus, the front pin 123 progressively and partially inserts the blade 24 into the hole 119 so as to be able to overlap the blocking stop 25, as illustrated in FIG. 6.

After having crossed the first inclined plane 251 of the blocking stop 25, the front pin 123 progressively reduces the pressure exerted on the second inclined plane 252 of the blocking stop 25. This enables a progressive expansion of the blade 24 and therefore a return of the blocking stop 25 into the blocking position. Thus, as soon as the front pin 123 has completely crossed the blocking stop 25, it fits into the second end 232 of the front groove 23 of the lower shuttle 2.

When the transition area is completed, i.e. the movable panel is located in the sliding plane, the front pin 123 is located in the second end 232 of the front groove 23 of the lower shuttle 2, associated with the open position of the movable panel.

In other words, in the transition area, the front pin 123 elastically deforms the blade 24 to move the blocking stop 25 away in order to join the second end 232 of the front groove 23 of the lower shuttle 2, associated with the open position of the movable panel.

Figures 7A, 7B:
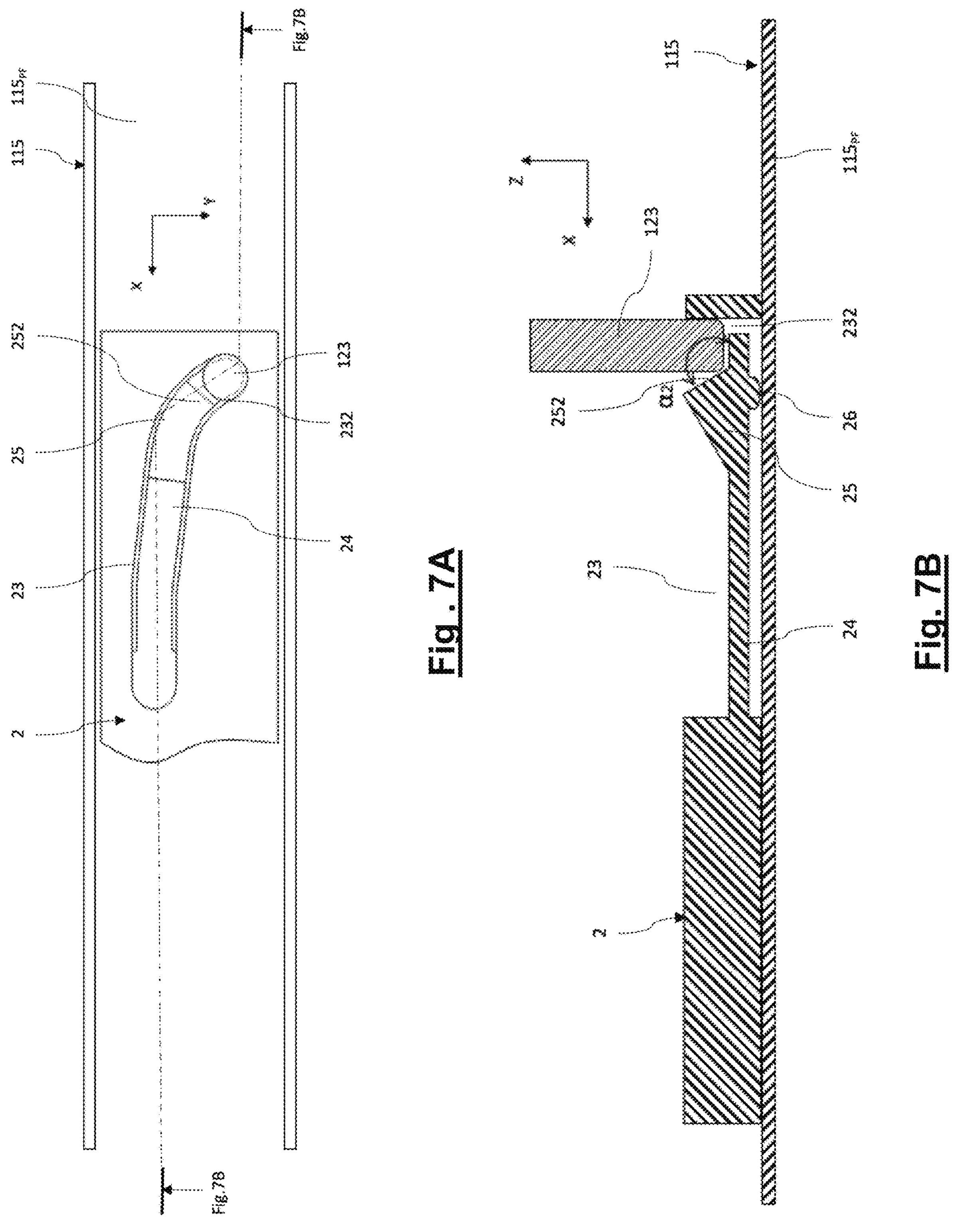
FIGS. 7A, 7B and 7C illustrate different views of the position of a pin of the movable panel with respect to the blocking means of FIGS. 2 and 3 when the movable panel is in the open position.
Figure 7C:
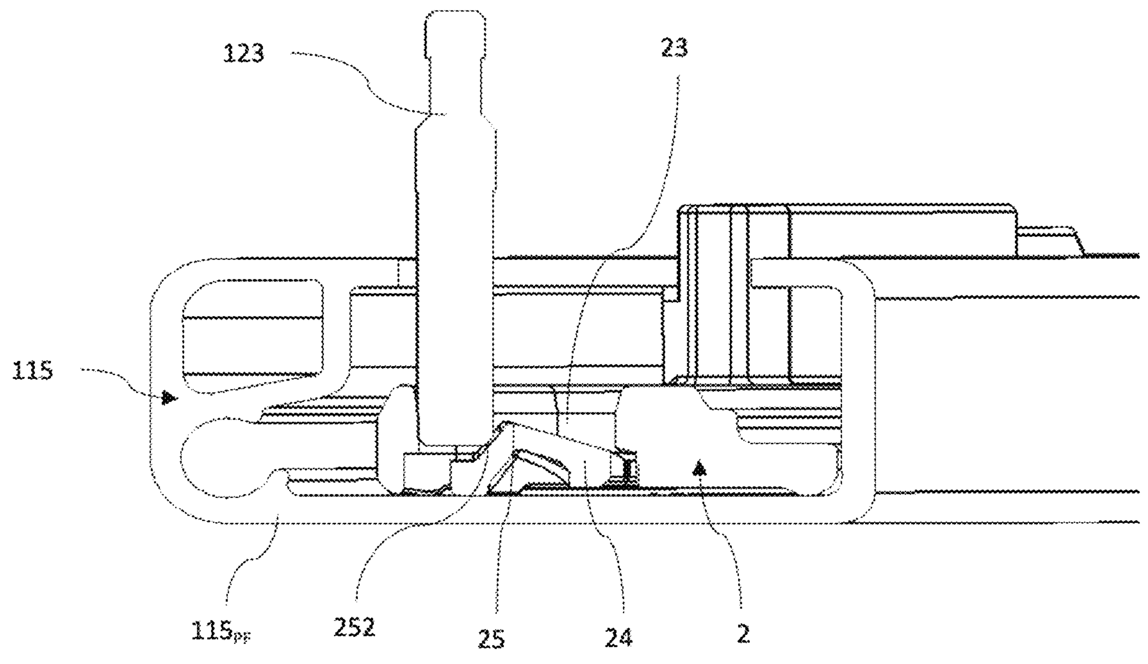

FIGS. 7A, 7B and 7C illustrate different views of the closure device during the second movement of the movable panel, i.e. when the movable panel is in the sliding plane in the opening position(s).

When the movable panel is in the open position, i.e. located in the closure plane, the front pin 123 is located at the second end 232 of the front groove 23 of the lower shuttle 2. Thus, the front pin 123 is blocked according to the X axis.

In the open position, blocking of the front pin 123 according to the Y axis is achieved by the blocking stop 25.

More specifically, when the movable panel is in the sliding plane and sliding of the lower shuttle 2 in the lower rail 115 continues towards the rear of the vehicle, the blade 24 of the lower shuttle 2 is spaced apart from the hole 119 so that the excrescence 26 rests on the bottom wall $\mathbf{115}_{FP}$ of the lower rail 115. Thus, even though the front pin 123 exerts a pressure force on the second inclined plane 252 of the blocking stop 25, the blade 24 cannot be deformed.

Therefore, the blocking stop 25 opposes any movement of the front pin 123 according to the Y axis. Hence, the front pin 123 is held in a blocking position at the second end 232 of the front groove 23 of the lower shuttle 2, associated with the open position of the movable panel.

Thus, one could notice that such a structure of the blocking means allows, with limited space requirement, ensuring a simple and effective blocking of the front pin carried by the movable panel when the latter is in the opening position, and that being so without disturbing the closure of the movable panel.

5.3 Other Aspects and Variants

In the above-described embodiment, the blocking means in accordance with the proposed technique are described in connection with a front groove of a lower shuttle. Preferably, such blocking means find application in the pins cooperating with grooves whose shape is substantially perpendicular to the sliding plane in the open position of the movable panel. Of course, such blocking means could, nonetheless, be considered for any groove formed in a guide shuttle and cooperating with a pin carried by a movable panel belonging to a device for closing off an aperture.

In the above-described embodiment, the hole, enabling disengagement of the pin from the stop of the flexible blade to move when the movable panel is in the transition area, is made by stamping the bottom of the rail. Alternatively, any other method enabling the formation of such a hole may be implemented.

In another alternative embodiment (not illustrated), the hole formed in the rail is replaced by a cup, i.e. a non-through recess directed according to the Z axis, also enabling the movement, the deformation, of the flexible blade in order to ensure the disengagement of the pin when the movable panel is in the transition area. For example, such a cup is made by stamping the bottom of the rail. The cup may also be an affixed part fitting into an opening formed in the bottom of the rail or is an affixed part arranged opposite this opening. For example, in the case where the proposed technique relates to a lower rail, the cuvette is formed by a drain part, arranged under or around the opening, so as to enable, besides the passage of the flexible blade in the hole, the recovery of the water present in the rail. In the case where the proposed technique relates to an upper rail, the hole enabling passage of the flexible blade is masked/covered by the endpiece in particular so as to avoid light leakage.

In the above-described embodiment, the flexible blade, carrying the stop for blocking the pin, is formed in the mass of the shuttle. Alternatively, such a flexible blade is affixed on the body of the shuttle, for example by screwing, clipping and/or gluing. In this case, the flexible blade is a leaf spring, for example metallic.

In another alternative embodiment (not illustrated), the bottom of the shuttle is stationary (i.e. non-deformable) and has an orifice in which is accommodated by a blocking stop. This blocking stop is translationally movable according to the A axis and controlled, by an element forming a spring arranged between the stop and the bottom of the rail, in order to enable blocking, or unblocking, of the pin carried by the movable panel when it is in the open position.

Figure 8:
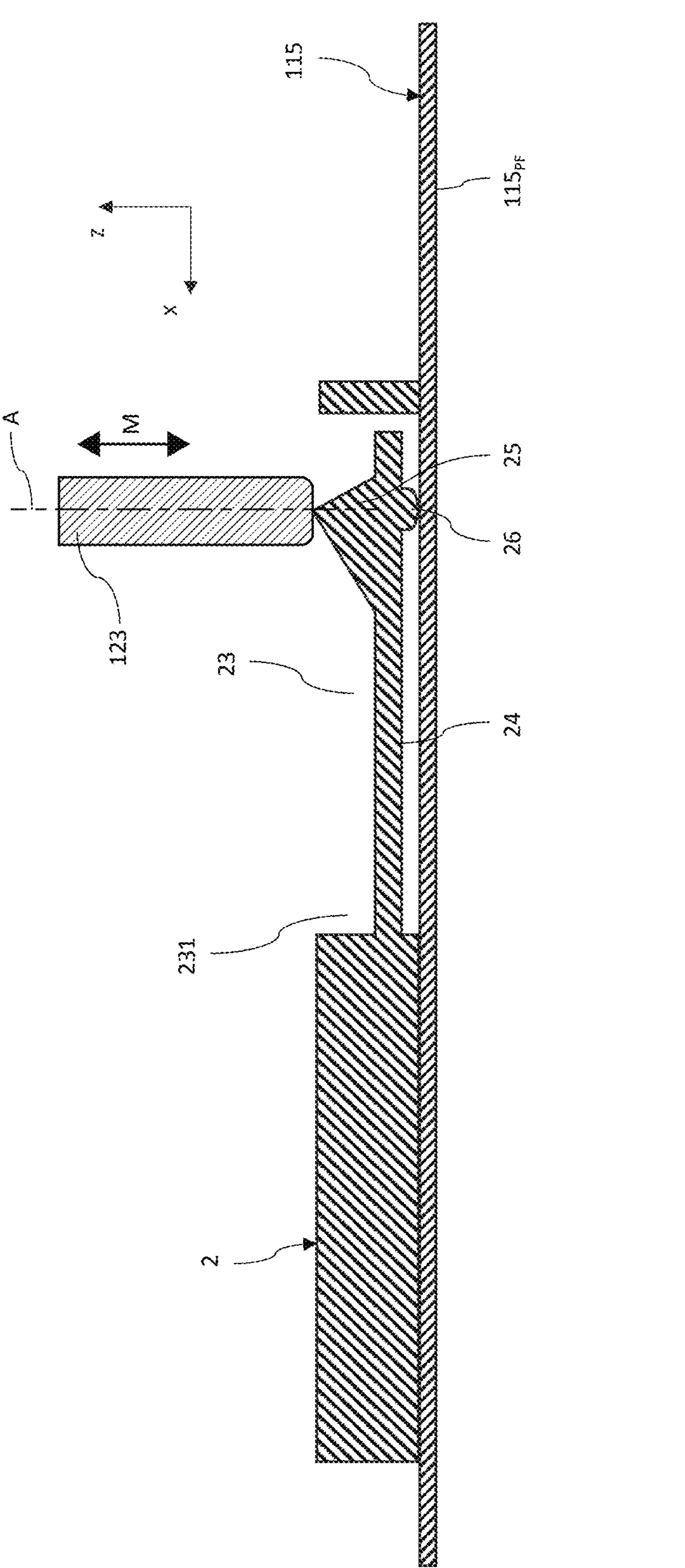
FIG. 8 illustrates another embodiment, wherein the pin is movable.

In another alternative embodiment, illustrated by FIG. 8, the blocking means are formed by a stationary blocking stop 25 formed in the stationary bottom of the groove 23. This stop is configured to cooperate with a pin 123, secured to the movable panel, translationally movable (M) along its axis A. Thus, the movement of the pin according to its axis A allows crossing the stop 25.

Hence, it clearly appears that the proposed technique is not limited to the previously-described embodiments given solely as example. It encompasses various modifications, alternative forms and other variants that a person skilled in the art could consider in the context of the present invention and in particular all combinations of the different operating modes described before, which could be considered separately or in combination.

According to different aspects, the proposed technique therefore has all or some of the following advantages, depending on the retained embodiments:

- guaranteeing a significant longevity of the closure device;
- improving guidance and/or stoppage of the movable panel;
- guaranteeing a simplified maintenance of the closure device;
- simplifying the assembly of the closure device;
- limiting the bulk of the closure device;
- limiting the manufacturing costs of the closure device;
- etc.

The invention claimed is:

1. A device for closing off an opening formed in a structure, comprising a stationary panel, in which the opening is defined, and at least one sliding movable panel guided along two guide rails mounted on a face of said stationary panel, between a closure position, closing off said opening, in a first, closure plane defined by said stationary panel, and at least one opening position, in a second, sliding plane, substantially parallel to said closure plane, each of said guide rails carrying at least one shuttle translationally guided in said guide rail, translationally movable in said guide rail, and ensuring passage of the movable panel from said closure position into said at least one opening position, and vice versa, using at least one groove, each guiding a pin secured to said movable panel, and the sliding movement of said movable panel in said closure plane to place said movable panel in an open position, wherein at least one of said at least one shuttle comprises means for blocking at least one of the pins in a corresponding groove, in a blocking position, when said movable panel is in said at least one opening position, so as to oppose an inadvertent movement of said movable panel relative to said shuttle according to a direction perpendicular to said sliding plane.

2. The device according to claim 1, wherein said groove has a bottom carrying a stop for blocking said pin, said bottom holding blocking said pin at an end of said groove corresponding to said opening position.

3. The device according to claim 2, wherein said stop is mounted on a flexible blade.

4. The device according to claim 3, wherein the device comprises means opposing a deformation of said blade when said movable panel is in said at least one opening position, and means enabling a deformation of said blade when said movable panel is in a transition area between said closure plane and said sliding plane.

5. The device according to claim 4, wherein said means opposing a deformation comprise an excrescence extending under said blade and bearing against a bottom of at least one of said guide rails.

6. The device according to claim 4, at least one of said guide rails has a release portion, for example a hole or a cup, coinciding with said transition area, so that said blade could move and enable disengagement of said pin from said stop, when said movable panel is in said transition area.

7. The device according to claim 6, wherein said release portion is made by stamping a bottom of said rail.

8. The device according to claim 6, wherein said release portion is an insert fitting into an opening formed in a bottom of said rail.

9. The device according to claim 2, wherein said stop has inclined planes.

10. The device according to claim 3, wherein said blade and said shuttle form a one-piece part.

11. The device according to claim 2, wherein said blade is affixed on said shuttle, by screwing, clipping or gluing.

12. The device according to claim 11, wherein said blade is a spring leaf.

13. The device according to claim 1, wherein said pin is also guided in a rail endpiece, having a guide portion ensuring blocking of said pin in a direction perpendicular to said sliding plane.

14. The device according to claim 1, wherein said pin is translationally movable along an axis of extension of said pin.

15. The device according to claim 2, wherein said pin is movable according to an axis of extension of said pin allowing said stop to be crossed.

16. A motor vehicle comprising at least one device for closing off an opening formed in a structure, comprising a stationary panel, in which the opening is defined, and at least one sliding movable panel guided along two guide rails mounted on a face of said stationary panel, between a closure position, closing off said opening, in a first plane defined by said stationary panel, called the closure plane, and at least one opening position, in a second plane, called the sliding plane, substantially parallel to said closure plane, each of said guide rails carrying at least one shuttle translationally guided in said guide rail, translationally movable in said guide rail, and ensuring passage of the movable panel from said closure position into said at least one opening position, and vice versa, using at least one groove each guiding a pin secured to said movable panel, and the sliding movement of said movable panel in said closure plane to place said movable panel in an open position, wherein at least one of said at least one shuttle comprises means for blocking at least one of said pins in a corresponding groove, in a blocking position, when said movable panel is in said at least one opening position, so as to oppose an inadvertent movement of said movable panel relative to said shuttle according to a direction perpendicular to said sliding plane.

17. A device for closing off an opening formed in a structure, comprising a stationary panel, in which the opening is defined, and at least one sliding movable panel guided along two guide rails mounted on a face of said stationary panel, between a closure position, closing off said opening, in a first, closure plane defined by said stationary panel, and at least one opening position, in a second, sliding plane, substantially parallel to said closure plane, each of said guide rails carrying at least one shuttle translationally guided in said guide rail, translationally movable in said guide rail, and ensuring passage of the movable panel from said closure position into said at least one opening position, and vice versa, using at least one groove each guiding a pin secured to said movable panel, and the sliding movement of said movable panel in said closure plane to place said movable panel in an open position, wherein at least one of said at least one shuttle comprises a groove guiding one of said pins, said groove having a bottom carrying a stop for blocking said pin, said bottom blocking said pin at an end of said groove corresponding to said at least one opening position, so as to oppose an inadvertent movement of said movable panel relative to said shuttle according to a direction perpendicular to said sliding plane.

18. The device according to claim 17, wherein said stop is mounted on a flexible blade.

* * * * *